(12) United States Patent
Dai et al.

(10) Patent No.: US 9,712,063 B2
(45) Date of Patent: Jul. 18, 2017

(54) APPARATUS AND METHOD FOR LOOSELY REGULATED POWER CONVERTERS

(71) Applicant: FutureWei Technologies, Inc., Plano, TX (US)

(72) Inventors: Heping Dai, Plano, TX (US); Daoshen Chen, Allen, TX (US); Bing Cai, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 389 days.

(21) Appl. No.: 13/923,112

(22) Filed: Jun. 20, 2013

(65) Prior Publication Data

US 2014/0306669 A1    Oct. 16, 2014

Related U.S. Application Data

(60) Provisional application No. 61/812,125, filed on Apr. 15, 2013.

(51) Int. Cl.
*H02M 1/00* (2006.01)
*H02M 3/335* (2006.01)
*H02M 3/156* (2006.01)

(52) U.S. Cl.
CPC ....... *H02M 3/33507* (2013.01); *H02M 3/156* (2013.01); *H02M 2001/0022* (2013.01); *H02M 2001/0025* (2013.01)

(58) Field of Classification Search
CPC ...... H02M 3/33507; H02M 3/28; H02M 3/33; H02M 1/00; H02M 3/33592; H02M 3/156; G05F 1/00
See application file for complete search history.

(56) References Cited

U.S. PATENT DOCUMENTS

| 4,929,882 | A | 5/1990 | Szepesi |
| 6,987,676 | B2 | 1/2006 | Cheng et al. |
| 7,072,190 | B2 | 7/2006 | Schlecht |
| 2005/0286278 | A1* | 12/2005 | Perreault .............. H02M 3/285 363/65 |
| 2007/0195557 | A1* | 8/2007 | Su ............................ B60K 6/28 363/17 |
| 2008/0211304 | A1* | 9/2008 | Farrington ........ H02M 3/33592 307/31 |

(Continued)

FOREIGN PATENT DOCUMENTS

| CN | 101015108 A | 8/2007 |
| CN | 101582640 A | 11/2009 |

OTHER PUBLICATIONS

International Search Report and Written Opinion, International Application No. PCT/CN2014/075378, Applicant: Huawei Technologies Co., Ltd., date of mailing Jul. 4, 2014, 16 pages.

*Primary Examiner* — Gustavo Rosario Benitez
(74) *Attorney, Agent, or Firm* — Slater Matsil, LLP (57) ABSTRACT

A method for improving a power converter's efficiency comprises detecting an input voltage of a power converter, determining an operation mode of the power converter based upon the input voltage of the power converter and generating a plurality of gate drive signals based upon a damped gain control, wherein the damped gain control is configured such that an output voltage of the power converter is in a range from a tightly regulated output voltage to an unregulated output voltage.

12 Claims, 4 Drawing Sheets

(56) References Cited

U.S. PATENT DOCUMENTS

| | | | |
|---|---|---|---|
| 2009/0206804 A1* | 8/2009 | Xu | H02M 3/1584 |
| | | | 323/234 |
| 2010/0060078 A1 | 3/2010 | Shaw | |
| 2012/0112723 A1 | 5/2012 | He et al. | |
| 2012/0113687 A1* | 5/2012 | Wildrick | H02M 3/3378 |
| | | | 363/21.02 |
| 2012/0139513 A1* | 6/2012 | Sreenivas | H02M 3/156 |
| | | | 323/272 |
| 2013/0027978 A1 | 1/2013 | Suzuki et al. | |
| 2014/0015449 A1 | 1/2014 | Biester et al. | |

* cited by examiner

APPARATUS AND METHOD FOR LOOSELY REGULATED POWER CONVERTERS

CROSS REFERENCE TO RELATED APPLICATIONS

This application is related to, and claims priority to U.S. Provisional Application No. 61/812,125, titled, "Apparatus and Method for Power Converters" filed on Apr. 15, 2013, which is herein incorporated by reference.

TECHNICAL FIELD

The present invention relates to a power converter, and, in particular embodiments, to a control mechanism for bus converter applications.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, LLC resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof. The downstream non-isolated power converters operate under a tight control loop so that fully regulated output voltages are fed into their respective loads.

SUMMARY OF THE INVENTION

These and other problems are generally solved or circumvented, and technical advantages are generally achieved, by preferred embodiments of the present invention which provide a loosely regulated power converter may achieve high efficiency as well as a better regulation in comparison with an unregulated power converter.

In accordance with an embodiment, a converter comprises an input coupled to a power source, a plurality of power switches coupled to the input, a magnetic device coupled to the power switches and a controller coupled to the power switches, wherein the controller is configured to generate a plurality of gate drive signals for the power switches, and wherein the gate drive signals are arranged such that an output voltage of the converter is in between a fully regulated output voltage and an unregulated output voltage.

In accordance with another embodiment, a method comprises detecting an input voltage of a power converter, wherein the power converter comprises an input coupled to a power source, a plurality of power switches coupled to the input and a controller coupled to the power switches.

The method further comprises generating a plurality of gate drive signals for the power switches, wherein the gate drive signals are arranged such that an output voltage of the converter is in between a fully regulated output voltage and an unregulated output voltage.

In accordance with yet another embodiment, a method comprises detecting an input voltage of a power converter, determining an operation mode of the power converter based upon the input voltage of the power converter and generating a plurality of gate drive signals based upon a damped gain control, wherein the damped gain control is configured such that an output voltage of the power converter is in a range from a tightly regulated output voltage to an unregulated output voltage.

An advantage of a preferred embodiment of the present invention is improving a power converter's efficiency through a damped gain control scheme.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless other-

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a damped gain control scheme for bus converters. The invention may also be applied, however, to a variety of power converters including isolated power converters such as full-bridge converters, half-bridge converters, forward converters, flyback converters and/or the like, non-isolated power converters such as buck converters, boost converters, buck-boost converters and/or the like, resonant converters such as LLC resonant converters and/or the like. Hereinafter, various embodiments will be explained in detail with reference to the accompanying drawings.

Figure 1:
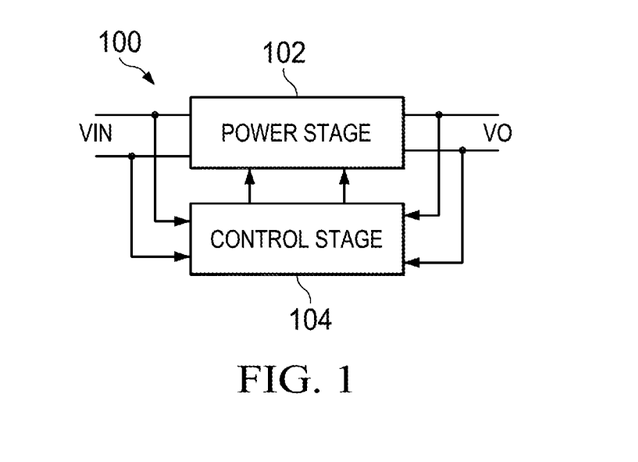
FIG. 1 illustrates a block diagram of a power converter in accordance with various embodiments of the present disclosure.

FIG. 1 illustrates a block diagram of a power converter in accordance with various embodiments of the present disclosure. The power converter 100 includes a power stage 102 and a control stage 104. The control stage 104 is coupled to the power stage 102 through a plurality of gate drive signals.

The power stage 102 may be a full-bridge converter, a half-bridge converter, a forward converter, a flyback converter, a buck converter, a boost converter, a buck-boost converter, a resonant converter, a linear regulator and/or the like.

The control stage 104, as shown in FIG. 1, detects signals from both the input of the power converter 100 and the output of the power converter 100. In addition, based upon the detected signals, the control stage 104 may generate a plurality of gate drive signals, which are fed into the power stage 102 as shown in FIG. 1. The gate drive signals are used to control the switching elements (not shown) of the power stage 102. As a result, the output voltage of the power converter 100 may vary in response to different gate drive signals.

It should be noted while FIG. 1 shows the control stage 104 may detect both the input of the power converter 100 such as VIN and the output of the power converter 100 such as VO, the control stage 104 may generate the gate drive signals based upon either the input or the output of the power converter 100. For example, the control stage 104 may only detect the signal at the input of the power stage 102 and generate the gate drive signals based upon a feedforward control mechanism. On the other hand, the control stage 104 may only detect the signal at the output of the power stage 102 and generate the gate drive signals based upon a feedback control mechanism.

In sum, the control stage 104 may generate the gate drive signals based upon a feedforward control scheme, a feedback control scheme, any combinations thereof and/or the like.

The gate drive signals may determine a variety of power converter parameters such as duty cycle, phase, switching frequency, any combinations thereof and the like. For example, in a non-isolated switching regulator such as a buck converter, the output voltage of the power converter 100 may vary in response to the change of the duty cycle, which is determined by the gate drive signals. Furthermore, in a phase-shift bridge converter, the phase change may lead to an output voltage variation. Moreover, in a resonant converter such as an LLC resonant converter, a variation of the switching frequency of the resonant converter may lead to a voltage variation at the output of the LLC resonant converter. The power converter control characteristics described above are well known in the art, and hence are not discussed in further detail to avoid repetition.

In accordance with some embodiments, a damped gain control mechanism is employed by the control stage 104. In particular, the control stage 104 may either increase or decrease a control variable (e.g., duty cycle, phase and/or switching frequency) of the power stage 102 from its targeted value under a tight control loop. For example, under a tight control loop, in response to an input voltage, the power stage 102 may operate at a tightly controlled duty cycle so as to maintain a regulated output. Under the damped gain control scheme, the power stage 102 may operate in a duty cycle band. In some embodiments, the power stage 102 may be of a duty cycle fixed at a point of the duty cycle band. Alternatively, the power stage 102 may be of a duty cycle swinging back and forth between a lower limit and an upper limit of the duty cycle band.

In accordance with an embodiment, the duty cycle band described above is in a range from about 90% of the tightly controlled duty cycle to about 110% of the tightly controlled duty cycle.

Figure 2:
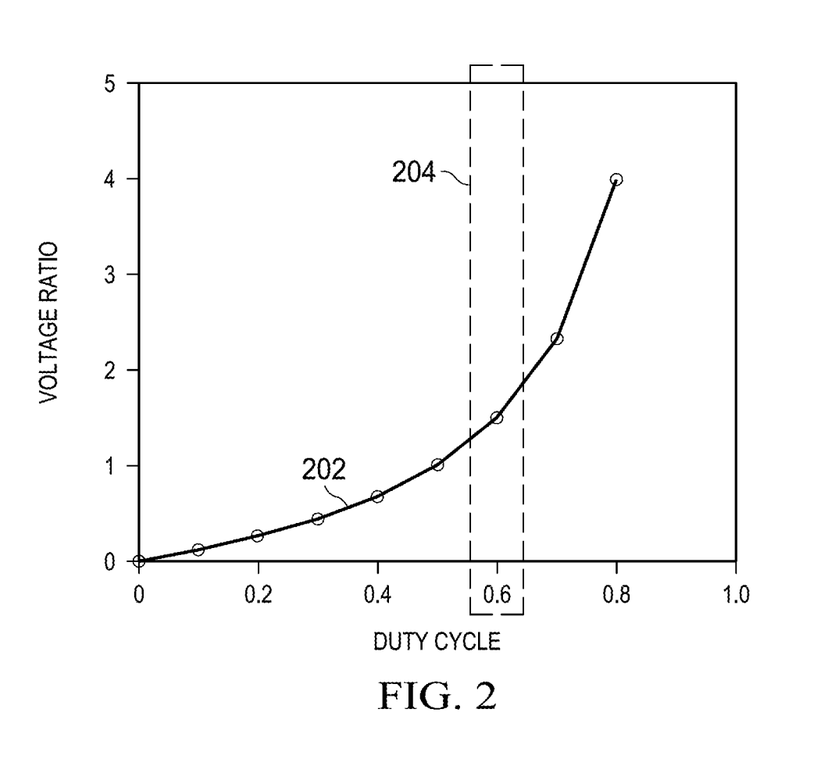
FIG. 2 illustrates the voltage gain of the power converter shown in FIG. 1 in accordance with various embodiments of the present disclosure.

FIG. 2 illustrates the voltage gain of the power converter shown in FIG. 1 in accordance with various embodiments of the present disclosure. The horizontal axis of FIG. 2 represents the duty cycle of a power converter such as the power converter 100 shown in FIG. 1. The vertical axis of FIG. 2 represents a ratio of the output voltage of the power converter 100 to the input voltage of the power converter 100.

A curve 202 illustrates a ratio of the output voltage to the input voltage when the duty cycle of the power converter varies from about zero to about the max duty cycle of the power converter. A circle on the curve 202 indicates a corresponding duty cycle at the horizontal axis and a corresponding ratio at the vertical axis when the output voltage of the power converter is regulated by a tight control loop. Throughout the description, the circle is alternatively referred to as a tightly controlled ratio.

In some embodiments, the power converter 100 may be loosely regulated. The loosely regulated power converter is similar to a power converter controlled by a control loop with a damped gain. Throughout the description, a loosely regulated control scheme is alternatively referred to as a damped gain control scheme.

As shown in FIG. 2, under a damped gain control scheme, the ratio of the output voltage to the input voltage may fall into a range indicated by the dashed rectangle 204. In other words, when the duty cycle of a tightly regulated power converter is equal to 0.6, the damped gain control may make the power converter operate in a duty cycle band as indicated by the dashed rectangle 204. In some embodiments, the ratio of a duty cycle under the damped gain control scheme to a duty cycle under a tight control scheme may be in a range from about 90% to about 110%.

An advantageous feature of the embodiment described above is that the power converter 100 may achieve high efficiency in comparison with a tightly controlled power converter. On the other hand, the power converter may be of a better regulation in comparison with an open-loop power converter.

Figure 3:
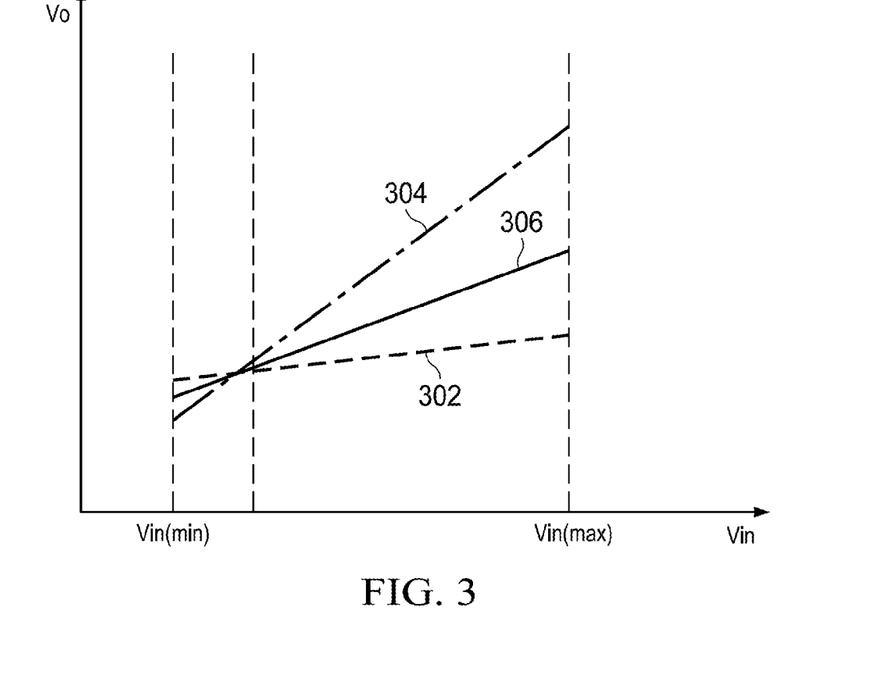
FIG. 3 illustrates a first illustrative control scheme of the power converter shown in FIG. 1 in accordance with various embodiments of the present disclosure.

FIG. 3 illustrates a first illustrative control scheme of the power converter shown in FIG. 1 in accordance with various embodiments of the present disclosure. The horizontal axis of FIG. 3 represents the input voltage of a power converter such as the power converter 100 shown in FIG. 1. As shown in FIG. 3, the input voltage is in a range from Vin (min) to Vin (max).

In some embodiments, Vin (min) is approximately equal to 36V and Vin (max) is approximately equal to 75 V. In alternative embodiments, Vin (min) is approximately equal to 36V and Vin (max) is approximately equal to 60 V.

The vertical axis of FIG. 3 represents the output voltage of the power converter 100. In some embodiments, the output voltage is a typical telecommunication bus voltage such as 12 V, 5 V, 3.3 V and the like. In alternative embodiments, the output voltage is an intermediate bus voltage such as 48V, 12V and the like.

A first slope 302 represents the Vo-Vin relationship for the power converter when a tight control loop is employed. In other words, the first slope 302 is a Vo-Vin relationship of a fully regulated power converter. In particular, the line regulation such as the variation of the output voltage versus the variation of the input voltage is substantially small. In some embodiments, the line regulation as indicated by the slope 302 is less than or equal to 10%. In alternative embodiments, the line regulation is less than or equal to 5%.

It should be noted while the power converter 100 is fully regulated, the output voltage may be a slope rather than a straight line because some factors may cause voltage variations at the output of the power converter 100. Such factors include line regulation, load regulation, temperature, any combinations thereof and/or the like.

A second slope 304 represents the Vo-Vin relationship for the power converter when an open-loop scheme is employed. In other words, the second slope 304 is a Vo-Vin relationship of an unregulated power converter. The voltage gain or the ratio of the output voltage to the input voltage may vary widely in response to different operation conditions. For example, a buck converter is of a 50% duty cycle in accordance with an open-loop control scheme. The buck converter's output voltage is about 50% of the input voltage.

A third slope 306 represents the Vo-Vin relationship for the power converter 100 when a damped gain control scheme is employed. As shown in FIG. 3, under the damped gain control scheme, the output voltage of the power converter falls between the fully regulated output voltage and the unregulated output voltage through a fixed duty cycle (e.g., 50% duty cycle).

It should be noted that the relative location of the third slope 306 shown in FIG. 3 is merely an example. A person skilled in the art will recognize that depending on different applications and design needs, the third slope 306 may be located at any point in between the first slope 302 and the second slope 304.

The damped gain control scheme may be achieved through a variety of implementations. For example, if the power converter is a dc/dc step-down converter such as a buck converter, the output voltage is insensitive to the variations of operation conditions (e.g., line, load and temperature changes) when the power converter operates under a tight control loop. On the other hand, the output voltage is almost proportional to the input voltage when the power converter operates under an open loop. The damped gain control scheme may force the power converter to operate at a duty cycle between the duty cycle of the fully regulated power converter and the duty cycle of the unregulated power converter.

Figure 4:
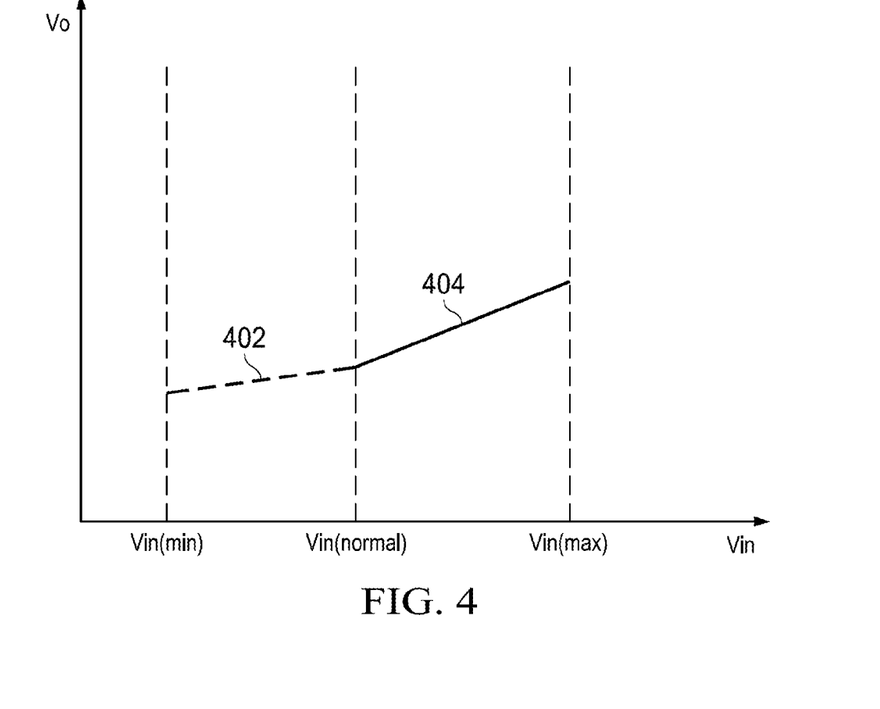
FIG. 4 illustrates a second illustrative control scheme of the power converter shown in FIG. 1 in accordance with various embodiments of the present disclosure.

It should further be noted while FIG. 3 shows the third slope 306 is linear, a person skilled in the art will recognize that the damped gain control scheme may be represented by a curve, a look-up table, any combinations thereof and/or the like, FIG. 4 illustrates a second illustrative control scheme of the power converter shown in FIG. 1 in accordance with various embodiments of the present disclosure. As shown in FIG. 4, in response to different input voltages, two different control schemes may be employed accordingly. In particular, when the input voltage is in a range from Vin (min) to Vin (normal), the power converter operates under a tight control loop as indicated by the slope 402. On the other hand, when the input voltage is in a range from Vin (normal) to Vin (max), the power converter operates under a damped gain control scheme as indicated by the slope 404. The damped gain control scheme has been described above with respect to FIG. 3, and hence is not discussed again herein.

It should be should be noted that the location of Vin (normal) on the horizontal axis shown in FIG. 4 is merely an example. A person skilled in the art will recognize that depending on different applications and design needs, Vin (normal) may be located at any point in between Vin (min) and Vin (max). For example, the Vin (normal) may be a predetermined threshold. The control stage (shown in FIG. 1) may determine the threshold based upon different applications and design needs.

Figure 5:
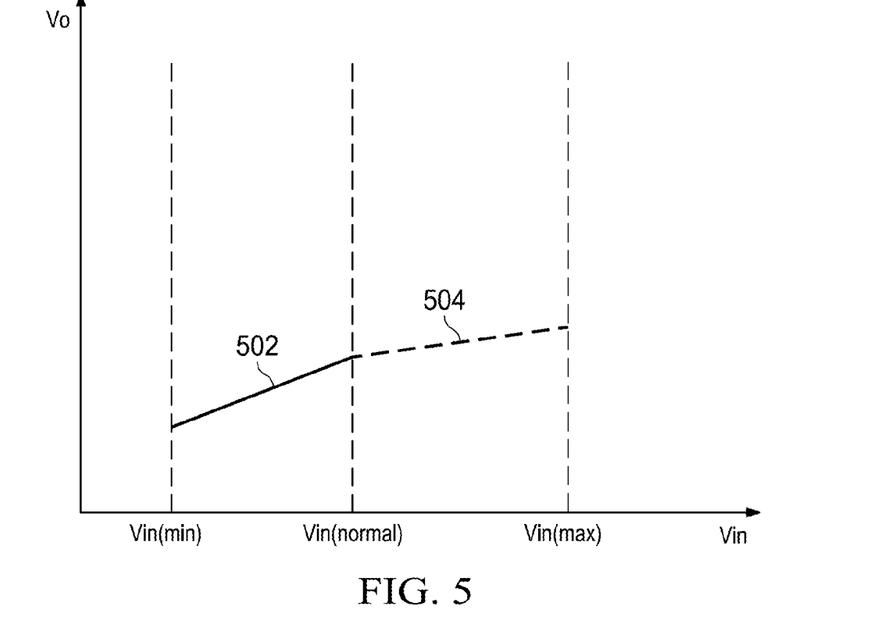
FIG. 5 illustrates a third illustrative control scheme of the power converter shown in FIG. 1 in accordance with various embodiments of the present disclosure.

FIG. 5 illustrates a third illustrative control scheme of the power converter shown in FIG. 1 in accordance with various embodiments of the present disclosure. The control schemes shown in FIG. 5 are similar to those shown in FIG. 4 except that the damped gain control scheme and the fully regulated control scheme are swapped as shown in FIG. 5. As shown in FIG. 5, the slope 502 represents the voltage gain under the damped gain control scheme. The slope 504 represents the voltage gain under a tight control loop.

Figure 6:
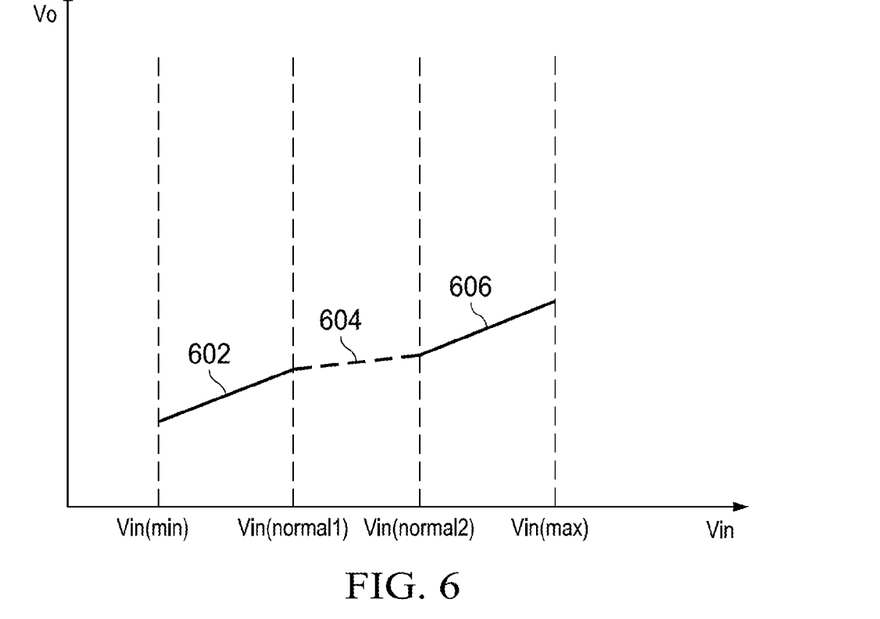
FIG. 6 illustrates a fourth illustrative control scheme of the power converter shown in FIG. 1 in accordance with various embodiments of the present disclosure.

FIG. 6 illustrates a fourth illustrative control scheme of the power converter shown in FIG. 1 in accordance with various embodiments of the present disclosure. The control schemes shown in FIG. 6 are similar to those shown in FIG. 4 except that the input voltage range is divided into three segments. In the first segments from Vin (min) to Vin (normal1), a damped gain control scheme is employed as indicated by the slope 602. In the second segments from Vin (normal1) to Vin (normal2), a tight control scheme is employed as indicated by the slope 604. In the third segments from Vin (normal2) to Vin (max), a damped gain control scheme is employed as indicated by the slope 606.

It should be should be noted that the locations of Vin (normal1) and Vin (normal2) on the horizontal axis shown in FIG. 6 are merely an example. A person skilled in the art will recognize that depending on different applications and design needs, Vin (normal1) and Vin (normal2) may be located at any point in between Vin (min) and Vin (max). For example, the Vin (normal1) and Vin (normal2) may be two threshold voltages determined by the control stage (shown in FIG. 1).

It should further be noted that FIG. 6 illustrates the input voltage range is divided into three segments. The number of segments illustrated herein is limited solely for the purpose of clearly illustrating the inventive aspects of the various embodiments. The present invention is not limited to any specific number of segments. In other words, the input voltage range may be divided into any number of segments. Moreover, the damped gain control mechanism may be applied to at least one segment of the input voltage range.

Figure 7:
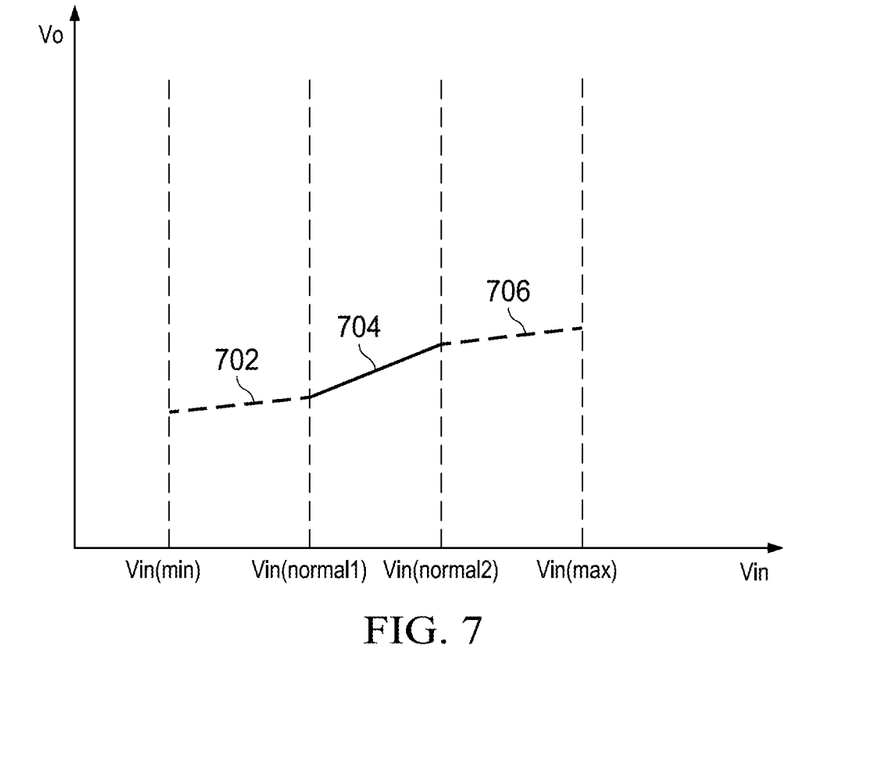
FIG. 7 illustrates a fifth illustrative control scheme of the power converter shown in FIG. 1 in accordance with various embodiments of the present disclosure.

FIG. 7 illustrates a fifth illustrative control scheme of the power converter shown in FIG. 1 in accordance with various embodiments of the present disclosure. The control schemes shown in FIG. 7 are similar to those shown in FIG. 6. In the first segments from Vin (min) to Vin (normal1), a tight control scheme is employed as indicated by the slope 702. In the second segments from Vin (normal1) to Vin (normal2), a damped gain control scheme is employed as indicated by the slope 704. In the third segments from Vin (normal2) to Vin (max), a tight control scheme is employed as indicated by the slope 706.

It should be noted that the illustrative embodiments described are based upon a control scheme in response to a variation of the input voltage of a power converter. The various embodiments of the present application are applicable to the control schemes in response to other operation condition variations such as load current, temperature, output voltage, input voltage, any combinations thereof and/or the like.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
an input coupled to a power source;
a plurality of power switches coupled to the input; and
a controller coupled to the power switches, wherein the controller is configured to generate a plurality of gate drive signals for the power switches, and wherein the gate drive signals are arranged such that an output voltage of the converter is in between a fully regulated output voltage and an unregulated output voltage, and wherein the gate drive signals are generated from a control signal in a band, and wherein the control signal is configured to swing back and forth between a lower limit and an upper limit of the band based upon a damped gain control mechanism, and wherein a gain of a control loop of a tight control mechanism is higher than a gain of a control loop of the damped gain control mechanism.

2. The converter of claim 1, wherein:
the gate drive signals are generated by varying a duty cycle of the converter from a tightly controlled duty cycle.

3. The converter of claim 1, wherein:
the gate drive signals are generated by varying a switching frequency of the converter from a tightly controlled switching frequency.

4. The converter of claim 1, wherein:
the gate drive signals are generated by varying a phase angle of the converter from a tightly controlled phase angle.

5. A method comprising:
detecting an input voltage of a power converter, wherein the power converter comprises:
an input coupled to a power source;
a plurality of power switches coupled to the input; and
a controller coupled to the power switches; and
generating a plurality of gate drive signals for the power switches, wherein the gate drive signals are arranged such that an output voltage of the power converter is in between a fully regulated output voltage and an unregulated output voltage, and wherein the gate drive signals are generated from a control signal in a band, and wherein the control signal is configured to swing back and forth between a lower limit and an upper limit of the band based upon a damped gain control mechanism, and wherein a gain of a control loop of a tight control mechanism is higher than a gain of a control loop of the damped gain control mechanism.

6. The method of claim 5, further comprising:
determining an operation mode of the power converter; and
varying a duty cycle of the power converter when the operation mode is a loosely regulated mode.

7. The method of claim 5, further comprising:
determining an operation mode of the power converter; and
varying a switching frequency of the power converter when the operation mode is a loosely regulated mode.

8. The method of claim 5, further comprising:
determining an operation mode of the power converter; and
varying a phase angle of the power converter when the operation mode is a loosely regulated mode.

9. A method comprising:
detecting an input voltage of a power converter;
determining an operation mode of the power converter based upon the input voltage of the power converter; and
generating a plurality of gate drive signals based upon a damped gain control when the power converter operates a damped gain control operation mode, wherein the damped gain control is configured such that an output voltage of the power converter is in a range from a tightly regulated output voltage to an unregulated output voltage, and wherein the gate drive signals are generated from a control signal in a band, and wherein the control signal is configured to swing back and forth between a lower limit and an upper limit of the band based upon a damped gain control mechanism, and wherein a gain of a control loop of a tight control mechanism is higher than a gain of a control loop of the damped gain control mechanism.

10. The method of claim 9, further comprising:
determining a first input voltage threshold based upon an input voltage range and the tightly regulated output voltage of the power converter;
operating the power converter in a tightly regulated mode when the input voltage of the power converter is less than the first input voltage threshold; and
operating the power converter in a loosely regulated mode when the input voltage of the power converter is greater than the first input voltage threshold.

11. The method of claim 9, further comprising:
determining a first input voltage threshold based upon an input voltage range and the tightly regulated output voltage of the power converter;
operating the power converter in a loosely regulated mode when the input voltage of the power converter is less than the first input voltage threshold; and
operating the power converter in a tightly regulated mode when the input voltage of the power converter is greater than the first input voltage threshold.

12. The method of claim 9, further comprising:
determining a first input voltage threshold and a second input voltage threshold based upon an input voltage range and the tightly regulated output voltage of the power converter, wherein the second input voltage threshold is greater than the first input voltage threshold; and
generating the plurality of gate drive signals, wherein the gate drive signals are arranged such that:
  the power converter operates in a first loosely regulated mode when the input voltage of the power converter is less than the first input voltage threshold;
  the power converter operates in a tightly regulated mode when the input voltage of the power converter is between the first input voltage threshold and the second input voltage threshold; and
  the power converter operates in a second loosely regulated mode when the input voltage of the power converter is greater than the second input voltage threshold.

* * * * *